United States Patent [19]

Kojima et al.

[11] Patent Number: 5,323,446
[45] Date of Patent: Jun. 21, 1994

[54] DIGITAL CELLULAR SWITCHING SYSTEM WITH MEANS FOR SECURING UNINTERRUPTED DATA TRANSPARENCY DURING HANDOFFS

[75] Inventors: Susumu Kojima; Noriaki Nagashima; Tadao Hashimoto, all of Tokyo, Japan

[73] Assignee: NEC Corporation, Tokyo, Japan

[21] Appl. No.: 870,083

[22] Filed: Apr. 17, 1992

[30] Foreign Application Priority Data

Apr. 17, 1991 [JP] Japan ................................. 3-112617

[51] Int. Cl.$^5$ .................... H04M 911/00; H04Q 7/00; H04B 1/00
[52] U.S. Cl. ..................................... 379/60; 379/59; 370/95.1; 370/95.3; 455/33.1; 455/33.2; 455/54.1; 455/54.2
[58] Field of Search ................. 379/59, 60; 455/33.1, 455/33.2, 54.1, 54.2; 370/95.3, 95.1

[56] References Cited

U.S. PATENT DOCUMENTS

| | | | |
|---|---|---|---|
| 4,754,453 | 6/1988 | Eizenhofer | 370/95.1 |
| 5,088,108 | 2/1992 | Uddenfeldt | 455/33.1 |
| 5,091,942 | 2/1992 | Dent | 379/59 |
| 5,175,867 | 12/1992 | Wejke et al. | 455/33.2 |

Primary Examiner—Stephen Chin
Assistant Examiner—Vijay Shankar
Attorney, Agent, or Firm—Sughrue, Mion, Zinn, Macpeak & Seas

[57] ABSTRACT

In a cellular communications system, the quality of a signal transmitted over a first two-way connection from a mobile station via a first base station is compared with a threshold to determine whether a handoff is to be performed to a second, adjacent base station. When the quality of the transmitted signal becomes lower than the threshold, a second two-way connection is established from the mobile station to the second base station, and a switching request signal and an information-bearing signal are sent from the mobile station over both connections to a switching exchange. In response to the request signal, one directional path of the first connection is cleared to prevent a version of the signal passing through the first connection from reaching the destination station, and a first switching complete signal is sent through the other path of the first connection to the mobile station to allow it to clear the first connection and return a second switching complete signal. The other path of the first connection is then cleared in response to the second switching complete signal, leaving the second connection between the mobile station and the second base station.

5 Claims, 9 Drawing Sheets

CELLULAR LINE INTERFACE CIRCUIT 14j

BASE STATION 20j

CORDLESS UNIT

DIGITAL CELLULAR SWITCHING SYSTEM WITH MEANS FOR SECURING UNINTERRUPTED DATA TRANSPARENCY DURING HANDOFFS

BACKGROUND OF THE INVENTION

The present invention relates generally to digital cellular mobile or cordless telephone systems, and more specifically to a handoff technique for switching communication paths of cordless stations when crossing a cell boundary without interruptions.

A prior art cellular switching system for mobile stations includes a time-division switch to which line interface circuits are terminated. In addition to subscriber stations, base stations are coupled by land lines to the line interface circuits to establish radio links to mobile stations such as cordless telephones or portable data terminals. The base stations are located in respective cells to serve home mobile stations, which may roam across from one cell to another. To ensure uninterrupted channel switching between base stations of adjacent cells when a mobile station is crossing their boundaries, several three-way conference circuits are terminated to the time-division switch through associated line interface circuits. One of the three-way conference circuits is switched to the base stations, as well as to a destination station to which the mobile station is connected. The mobile station transmits its signal to both base stations through separate paths. In the conference circuit, different versions of the transmitted signal are received and combined together to produce an average value, which is then combined with a signal from the destination station. This arrangement allows the mobile station to switch its channel to the new cell site without interruption.

However, if the information being transmitted is a data signal, it is impossible for the three-way conference circuit to ensure transparency for data signals.

SUMMARY OF THE INVENTION

It is therefore an object of the present invention to provide a digital cellular switching system which ensures uninterrupted data-transparent handoff operations.

According to a broader aspect of the present invention, there is provided a handoff method for a cellular communications system. According to this method, the quality of a signal over a first two-way connection from a destination station to a mobile station is compared with a threshold. When the signal quality becomes lower than the threshold, a second two-way connection is established and a switching request signal and an information-bearing signal are sent from the mobile station through both connections to a switching exchange. In response to the request signal, one directional path of the first connection is cleared by the exchange to prevent a version of the signal passing through the first connection from reaching the destination station and a first switching complete signal is sent through the other path of the first connection to the mobile station to allow it to clear the first connection and return a second switching complete signal. The other path of the first connection is then cleared by the exchange in response to the second switching complete signal.

According to a specific aspect of the present invention, there is provided a digital cellular switching system for serving mobile stations located in an area which is divided into at least first and second cells. The system comprises first and second base stations located respectively in the first and second cells for cooperating with each mobile station to establish first and second two-way time-division multiplex access (TDMA) radio links thereto, respectively. Timeslot switching means, or interchanger cooperates with the first base station to establish a first two-way timeslot link between timeslots of a destination station and timeslots of the first two-way TDMA radio link in response to a call request from a mobile station or from the destination station. The timeslot interchanger is responsive to receipt of a switching request signal from the mobile station for clearing a first directional path (from mobile station) of the first two-way timeslot link to prevent part of an information-bearing signal which is received from the first base station from reaching the destination station, and establishing a second two-way timeslot link between the timeslots of the destination station and timeslots of the second two-way TDMA radio link. The timeslot interchanger transmits a first switching complete signal through the first two-way TDMA radio link to the mobile station, and clears a second directional path (toward the mobile station) of the first two-way timeslot link in response to receipt of a second switching complete signal from the mobile station. With the first two-way TDMA radio link being established with the first base station, the mobile station constantly evaluates the quality of a signal from the destination station, compares it with a predetermined threshold, and cooperates with the second base station to establish the second two-way TDMA radio link when the evaluated quality is lower than the threshold. The mobile station transmits the switching request signal as well as the information-bearing signal through the first and second two-way TDMA radio links, and clears the first two-way TDMA radio link in response to receipt of the first switching complete signal, and transmits the second switching complete signal through the second two-way TDMA radio link.

BRIEF DESCRIPTION OF THE DRAWINGS

The present invention will be described in further detail with reference to the accompanying drawings, in which.

DETAILED DESCRIPTION

Figure 1:
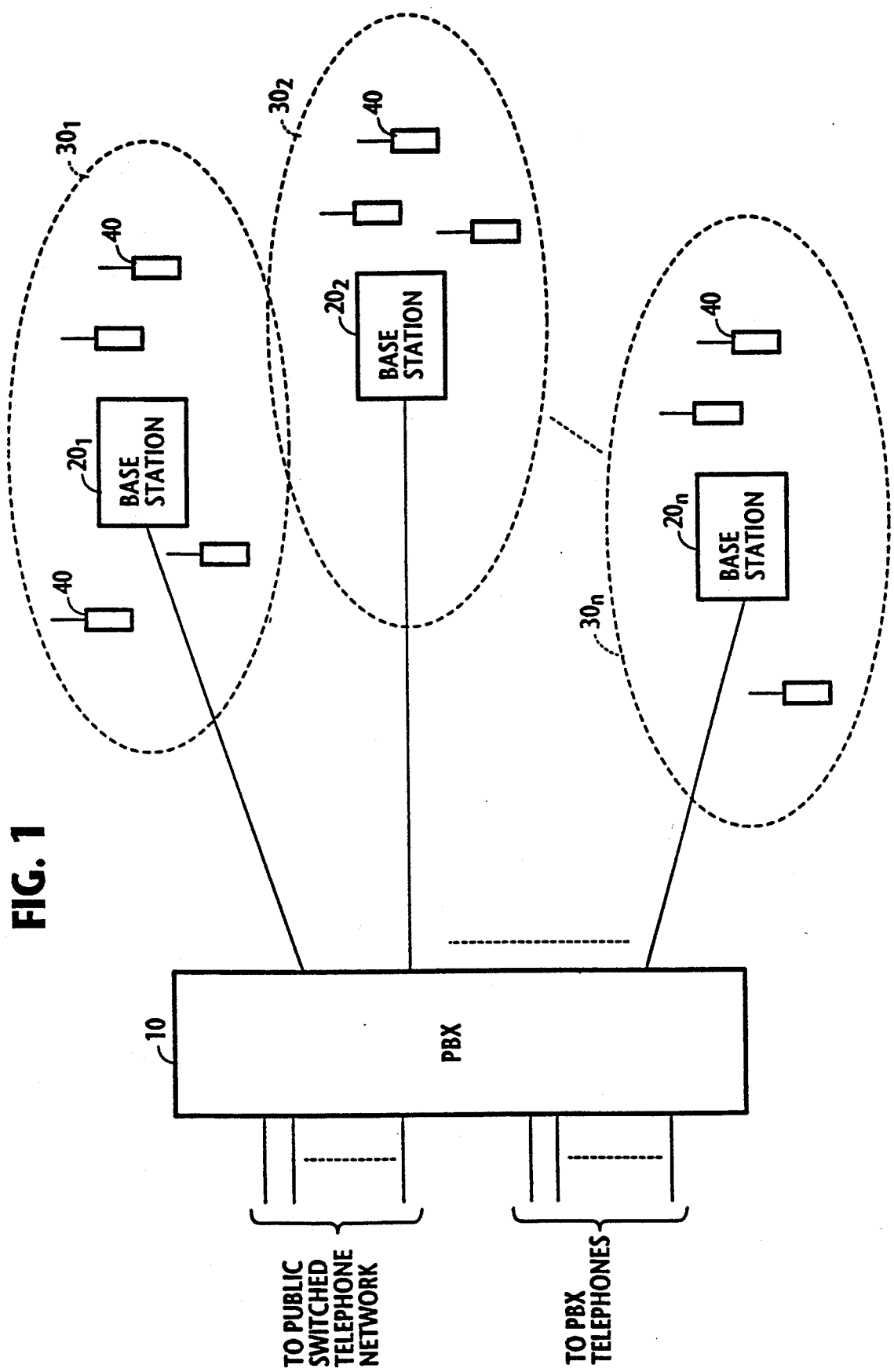
FIG. 1 shows in schematic form a cellular cordless telephone system embodying the present invention.

In FIG. 1, the digital cellular cordless telephone system of this invention includes radio base stations $20_1$, $20_2$ through $20_n$ which are located respectively in adjacent cells $30_1$, $30_2$ through $30_n$ and connected by land lines to a private telephone network or private branch exchange (PBX) 10 which may be connected to a public telephone network to serve cordless stations 40 through the base stations as well as PBX telephones.

Figure 2:
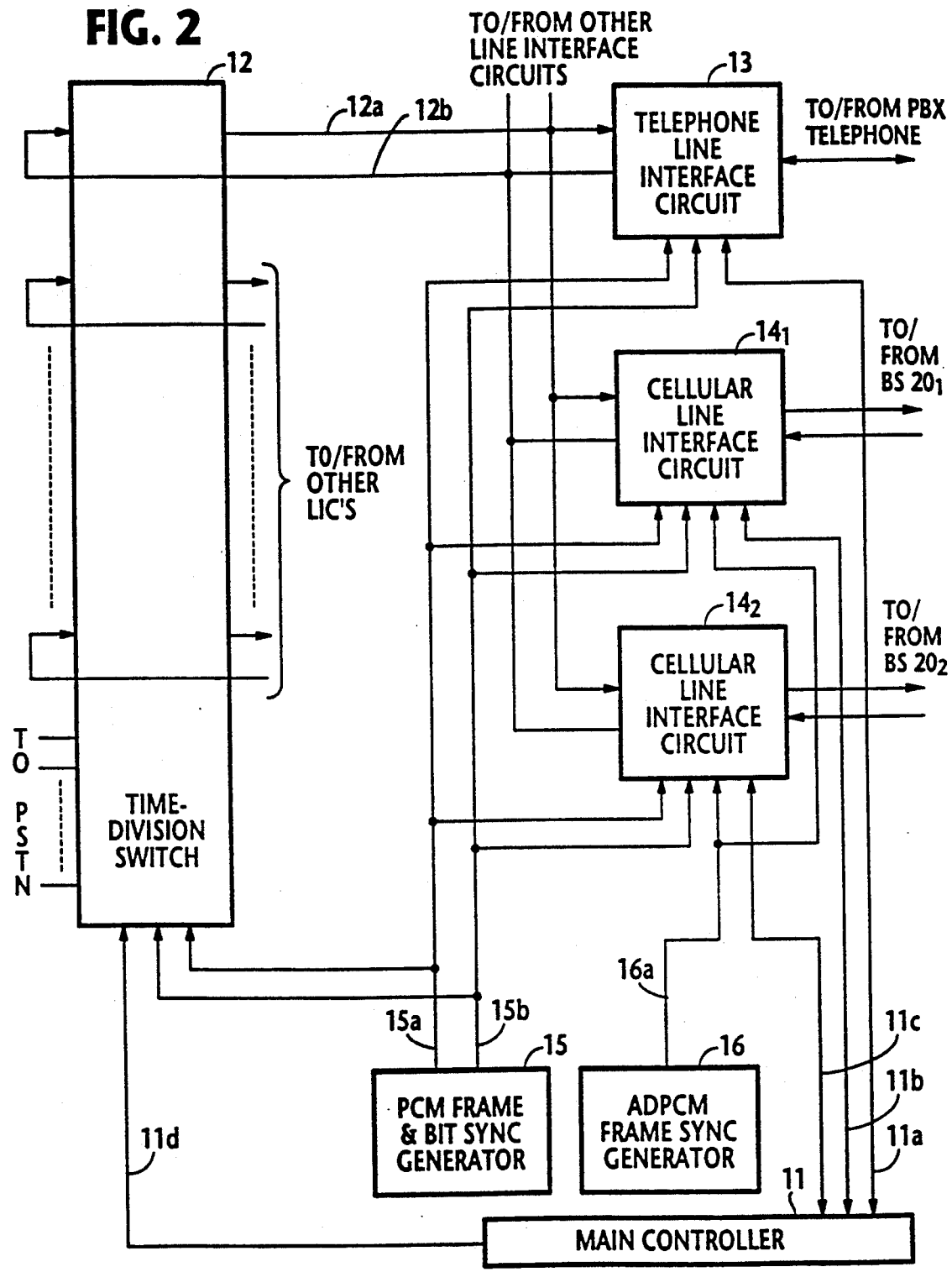
FIG. 2 shows in block diagram form the private branch exchange of FIG. 1.

As shown in FIG. 2, the PBX 10 comprises a time-division switch or time-slot interchanger 12 having outgoing and incoming TDM (time-division multiplex) highways 12a and 12b. Connected to the highways 12a and 12b are a telephone line interface circuit (TLIC) 13 which serves PBX telephone 50 and cellular line interface circuits (CLIC) $14_1$ and $14_2$. A PCM (pulse code modulation) sync pulse generator 15 supplies PCM frame sync pulses and PCM bit pulses respectively on leads 15a and 15b to the time-division switch 12 and line interface circuits $14_1$, $14_2$ and 13 and to other line circuits for PBX telephones to enable them to determine their assigned incoming and outgoing PCM timeslots of the incoming and outgoing TDM signals. A radio frame sync pulse generator 16 is provided for supplying the base station line circuits $14_1$ and $14_2$ with radio frame sync pulses on lead 16a to enable them to convert TDM format into ADPCM (adaptive differential PCM) burst signals for transmission to cordless units and convert received ADPCM burst signals to a TDM frame sequence. A main controller 11 provides overall system control by exchanging control signals with all line interface circuits through control lines 11a, 11b and 11c and supplying switching control signals to the time-division switch 12 through control line 11d.

Figure 3:
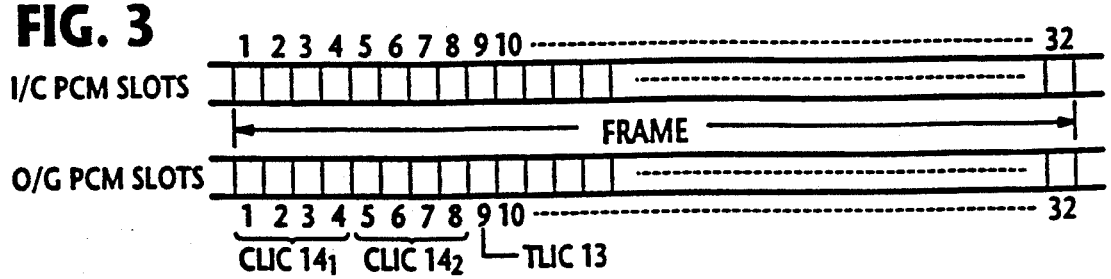
FIG. 3 shows a frame format of a PCM sequence on each highway of the time-division switch of FIG. 2.

As illustrated in FIG. 3, 8-bit PCM signals of each direction of transmission are multiplexed on thirty-two timeslots of a PCM frame. The outgoing and incoming PCM frames appear respectively on highways 12a and 12b. Four two-way channels are assigned to each base station. Typically, timeslots #1~#4 are assigned to CLIC $14_1$ and timeslots #5-#8 are assigned to CLIC $14_2$ and timeslot #9 is assigned to TLIC 13.

Although not shown in FIG. 2, other incoming and outgoing highways are terminated to the time-division switch 12 so that it provides timeslot interchanging among $N \times 32$ PCM frames for both directions of transmission.

Figure 4:
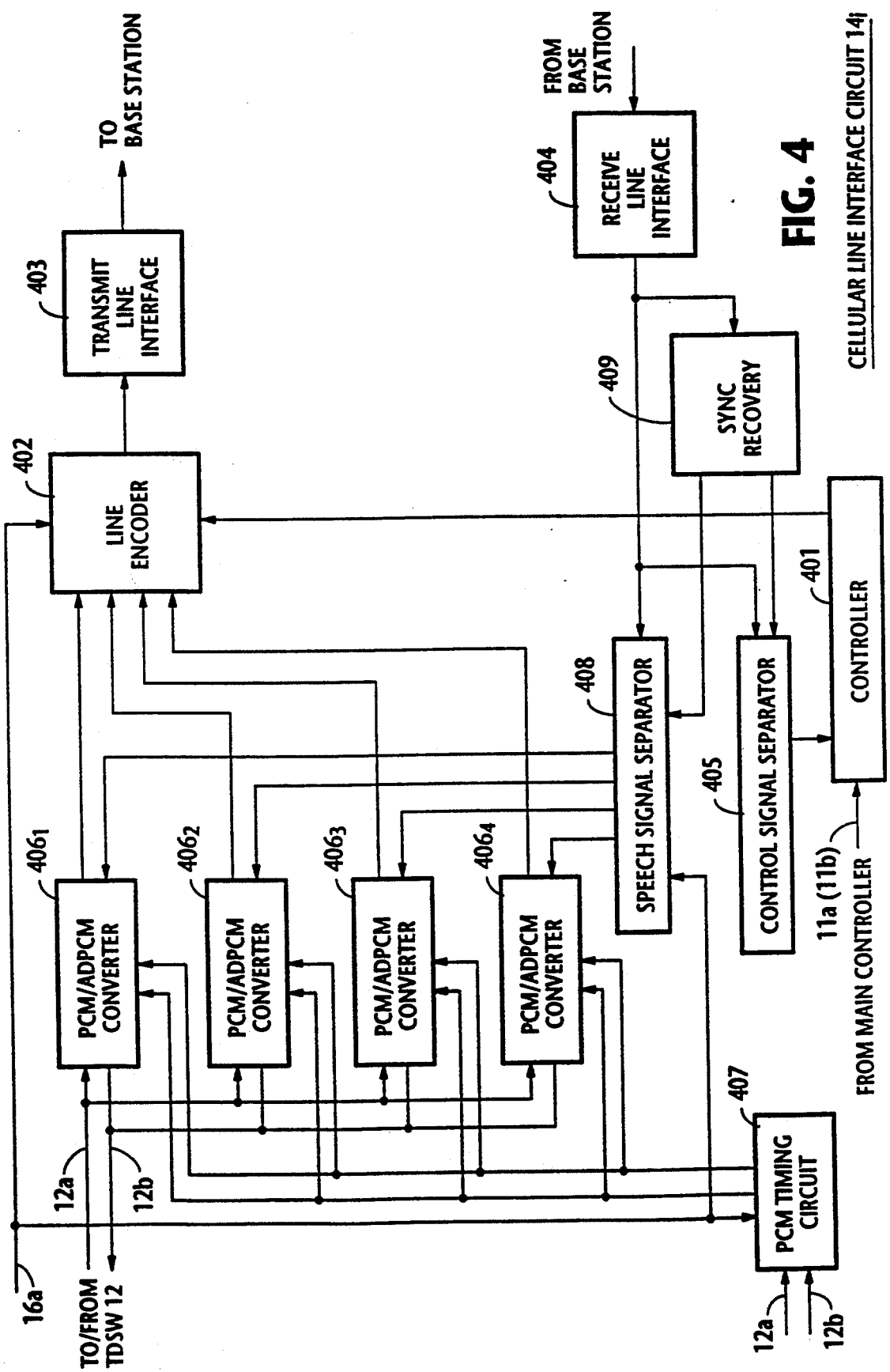
FIG. 4 shows in block diagram form the details of each cellular line interface circuit of FIG. 3.
Figure 7:
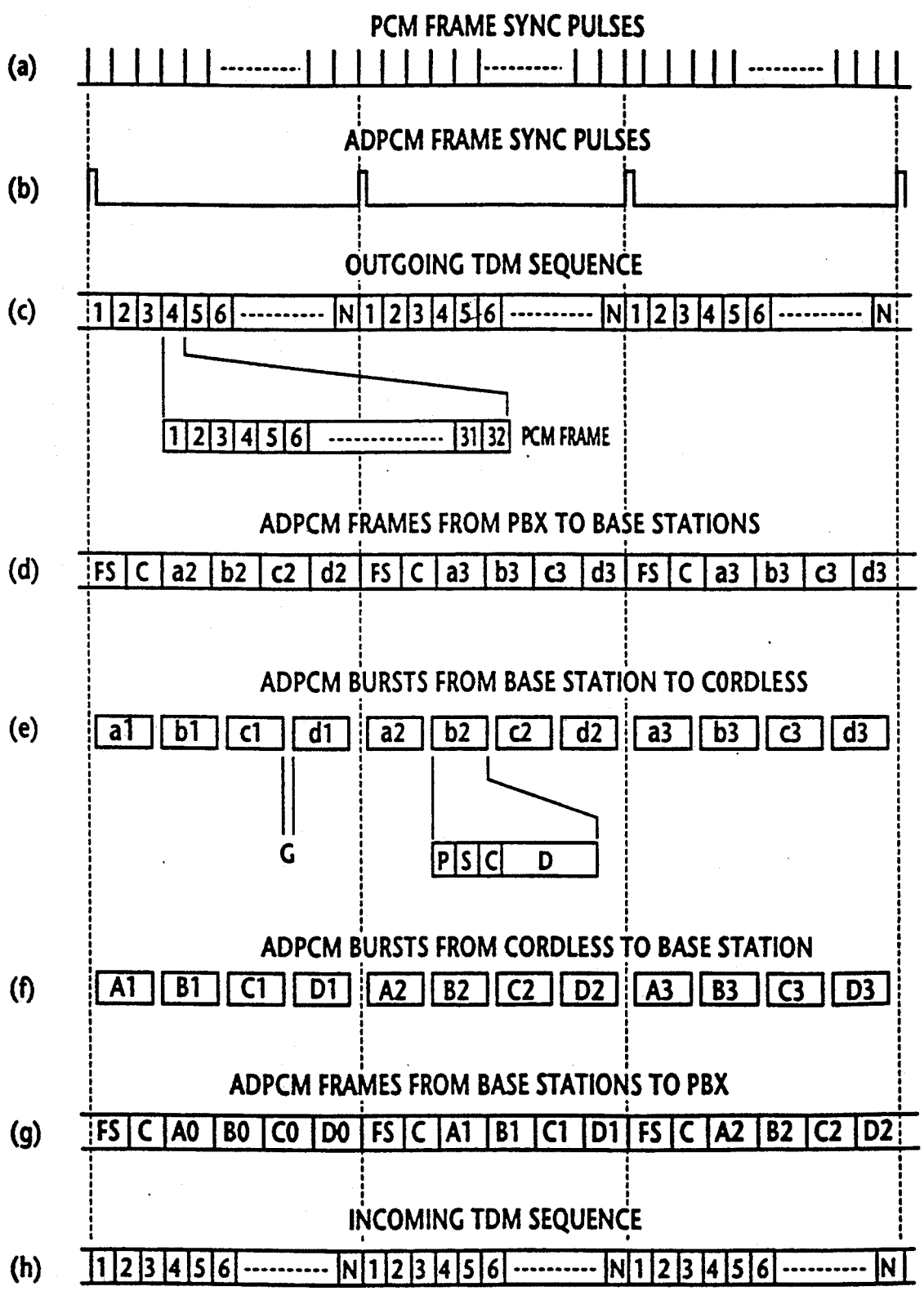
FIG. 7 shows various signals used in the system of the present invention.

Details of each of cellular line interface circuits 14 are shown in FIG. 4. A controller 401 receives control signals from the main controller 11 through lead 11b (or 11c) for application to a line encoder 402 whose output is coupled through a transmit line interface 403 to the associated base station. As shown in part (d) FIG. 7, the cellular line interface circuit 14 of the PBX transmits signals in an ADPCM frame format which begins with a frame sync field FS followed by a control field C and a sequence of four speech signal fields "$a_i$", "$b_i$", "$c_i$" and "$d_i$".

ADPCM signals from the associated base station are received by a receive line interface 404 whose output is coupled to a control signal detector 405 and a speech signal detector 408 and further to a sync recovery circuit 409. The sync recovery circuit 409 extracts bit and frame timing clock from the received ADPCM signal. The control field of the received ADPCM frame is separated by the control signal detector 405 using a control field timing signal from the sync timing generator 409 and applied to the controller 401, while the speech signals of the ADPCM frame are individually separated by the speech signal detector 408 using radio frame sync pulses on lead 16a and a speech field timing signal from the sync recovery circuit 409. As shown in part (g) of FIG. 7, ADPCM signals "$A_i$", "$B_i$", "$C_i$" and "$D_i$" are separated by the detector 408 and supplied respectively to PCM/ADPCM converters $406_1$, $406_2$, $406_3$, and $406_4$ in which they are converted and multiplexed onto a PCM frame and combined with other PCM frames to form an ($N \times 32$)-frame incoming TDM signal as shown in part (h) of FIG. 7. These converters are connected to the highways 12a and 12b for exchanging incoming and outgoing TDM frame sequences with the time-division switch 12 to detect assigned timeslots by using timing pulses from a PCM timing circuit 407 to which the outputs of timing pulse generator 15 are supplied on leads 15a, 15b and the output of radio frame sync pulse generator 16 is supplied on lead 16a. Each of these converters provides conversion between a 2,048 Mb/s TDM frame and an ADPCM frame for each direction of transmission. The ADPCM outputs from converters 406 are supplied to the line encoder 402 in which they are converted to a bipolar signals according to a prescribed line coding scheme and multiplexed with other bipolar signals in response to radio frame sync pulses on lead 16a, the output of the line encoder being coupled to line interface 403 for transmission to the associated base station.

Figure 5:
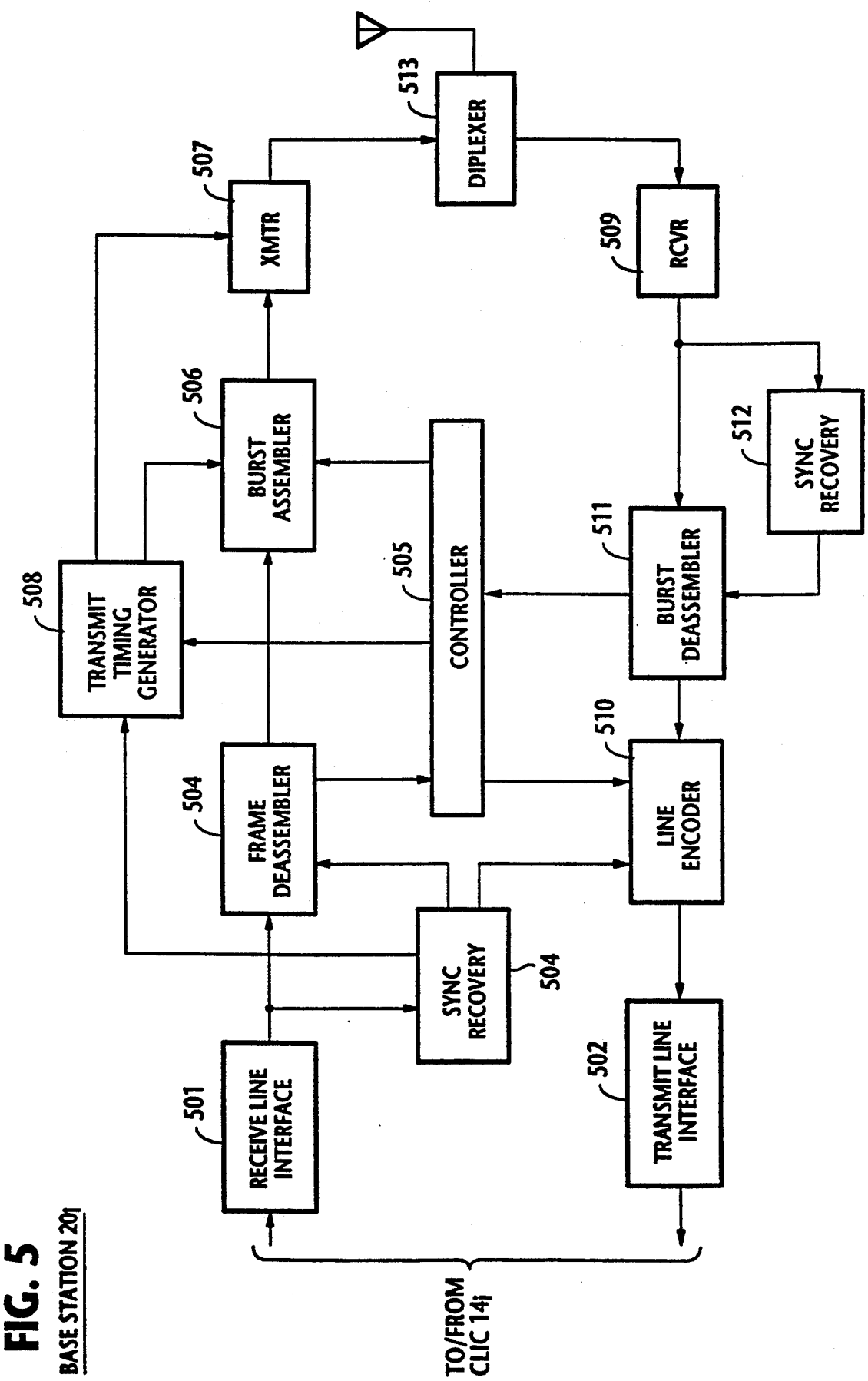
FIG. 5 shows in block diagram form the details of a base station.

Details of each base station are shown in FIG. 5. Each base station is provided with a receive line interface 501 for receiving bipolar ADPCM frame sequences transmitted from the associated line interface circuit 14 of the PBX 10. The output of the line interface 501 is fed into a sync recovery circuit 503 and a field detector 504 by which the transmitted control field C is extracted from each ADPCM frame using a frame sync extracted by the sync timing recovery circuit 503, the extracted control field being applied to a controller 505 which provides overall system control functions including selection of frequencies for reception and transmission. The transmitted speech signals are also separated by frame deassembler 504 and applied to a burst assembler 506 in which they are converted to a sequence of bursts separated by guard bands. Each burst of the ADPCM signal contains a preamble P, a sync field S, a control field C and an information (speech or data) field D as shown in part (e) of FIG. 7. A transmit timing generator 508 is provided to respond to the radio frame timing signal from sync recovery circuit 503 and a slot busy/idle status signal from the controller 505 and generates a slot timing signal for coupling to the burst assembler 506. In addition, the timing generator 508 supplies enabling pulses to a radio transmitter 507. In this way, burst signals generated by burst assembler 506 are modulated upon a carrier by transmitter 507 when enabled for transmission through diplexer 513 to cordless units. ADPCM burst signals (part (f) of FIG. 7) are transmitted from cordless units and received and demodulated by a receiver 509 and applied to a burst deassembler 511 and a sync recovery circuit 512. Using a sync timing signal recovered by the sync recovery circuit 512, burst deassembler 511 separates the control field from each burst signal for coupling to the controller 505 and applies speech signals contained in the data field to a line encoder 510. Line encoder 510 converts the demodulated speech signal into a line code format as shown in part (g) of FIG. 7, using a control signal supplied from the controller 505. The output of line encoder 510 is coupled through a transmit line interface 502 to the associated line interface circuit of the PBX 10.

Figure 6:
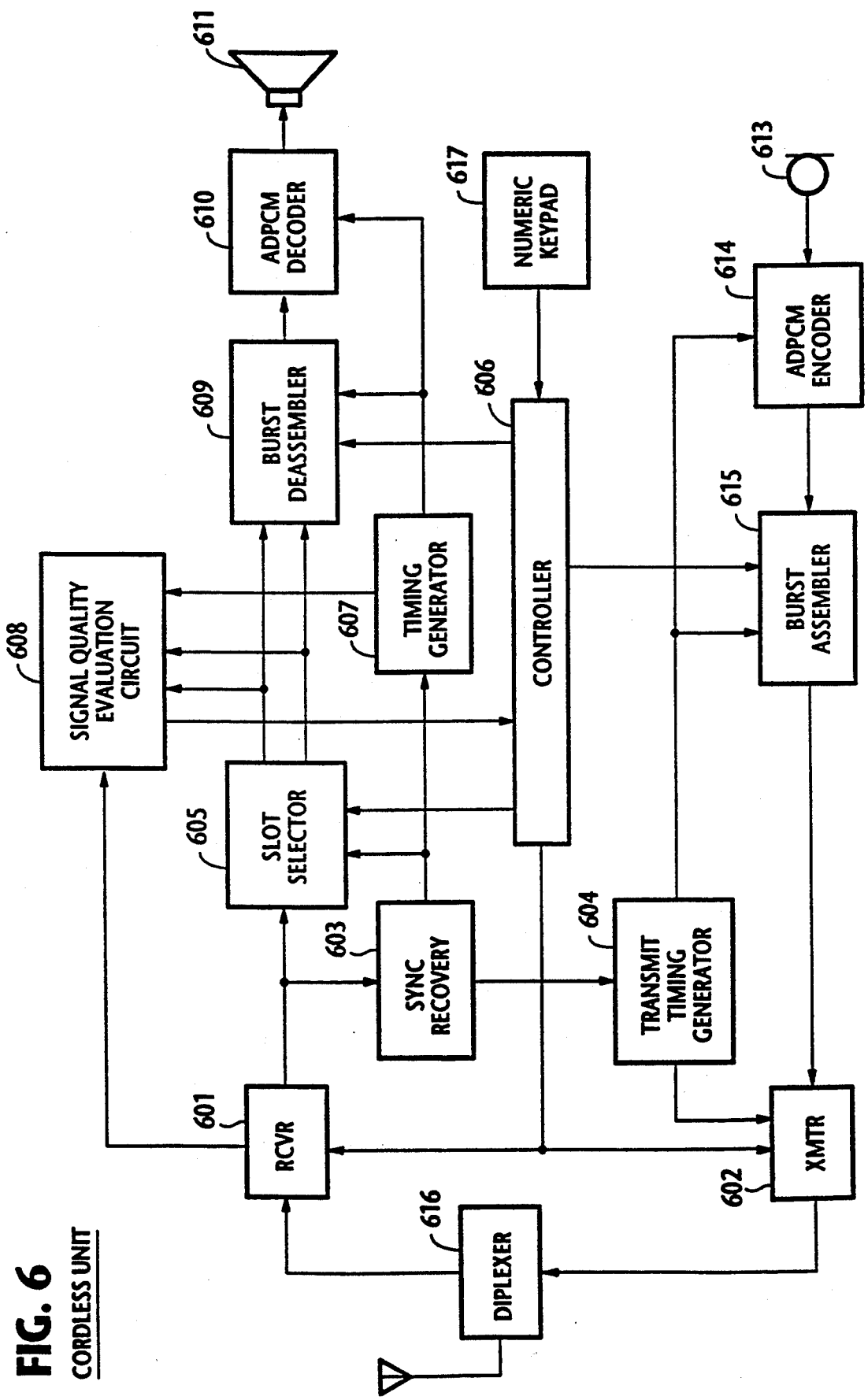
FIG. 6 shows in block diagram form the details of a cordless unit.

FIG. 6 shows details of each cordless unit. In contrast to the base station which handles all timeslots of an ADPCM frame, the cordless unit handles only one timeslot during normal operation and uses two timeslots during handoffs for simultaneously establishing separate routes to the base stations of adjacent cells. With the exception of these functional differences, the cordless unit is basically of the same configuration as the base station. Specifically, it comprises a receiver 601 for reception and demodulation of an ADPCM frame received through diplexer 616 from the base station of a cell in which it is located. A timeslot selector 605 is connected to receive the demodulated signal to select one of the four timeslots for each direction of transmission that is specified during normal operation by a controller 606. In addition to the timeslot in use, timeslot selector 605 selects an extra timeslot for each direction of transmission in response to a command signal from controller 606 during a handoff period.

Sync timing is recovered by a recovery circuit 603 from the output of the receiver 601, the output of sync recovery circuit 603 being coupled to a transmit timing generator 603 and a receive timing generator 607 which generates receive timing signals for coupling to a signal quality evaluation circuit 608, a burst deassembler 609 and an ADPCM decoder 610 to the output of which a loudspeaker 611 is connected. To controller 606 is also connected a numeric keypad 617 for dialing and data entry purposes.

Burst deassembler 609 is connected to the outputs of timeslot selector 605 for separating the speech and control signals for coupling to the ADPCM decoder 610 and to the controller 606, respectively.

A speech signal from a microphone 613 is converted to digital form by an ADPCM encoder 615 whose output is coupled to a burst assembler 615. By using a control signal from controller 606 and a transmit timing signal from transmit timing generator 604, burst assembler 615 generates an ADPCM burst frame by assembling a preamble, a burst sync and the output of ADPCM encoder 614. The output of burst assembler 615 is coupled to a transmitter 602 in which it is used to modulate a carrier for transmission to the base station. Controller 606 further controls the receiver 601 and transmitter 602 to tune them to appropriate radio frequencies.

The signal quality evaluation circuit 608 is coupled to the outputs of timeslot selector 605 to detect the signal of a timeslot currently in use and evaluates the quality of the detected signal. The result of the signal quality evaluation is applied to controller 606 in which it is compared with a prescribed threshold. If controller 606 determines that the signal quality is lower than the threshold, it supplies a command signal to timeslot selector 605 to cause it to select an extra timeslot for each direction of transmission and supplies a channel switching request signal to burst assembler 615 so that it is inserted into the control field of a burst frame. This invokes a channel switching sequence in a manner as will be described hereinbelow with reference to FIGS. 8A, 8B, 8C and 8D in which interchanged timeslots are indicated by physical lines.

Figure 8A:
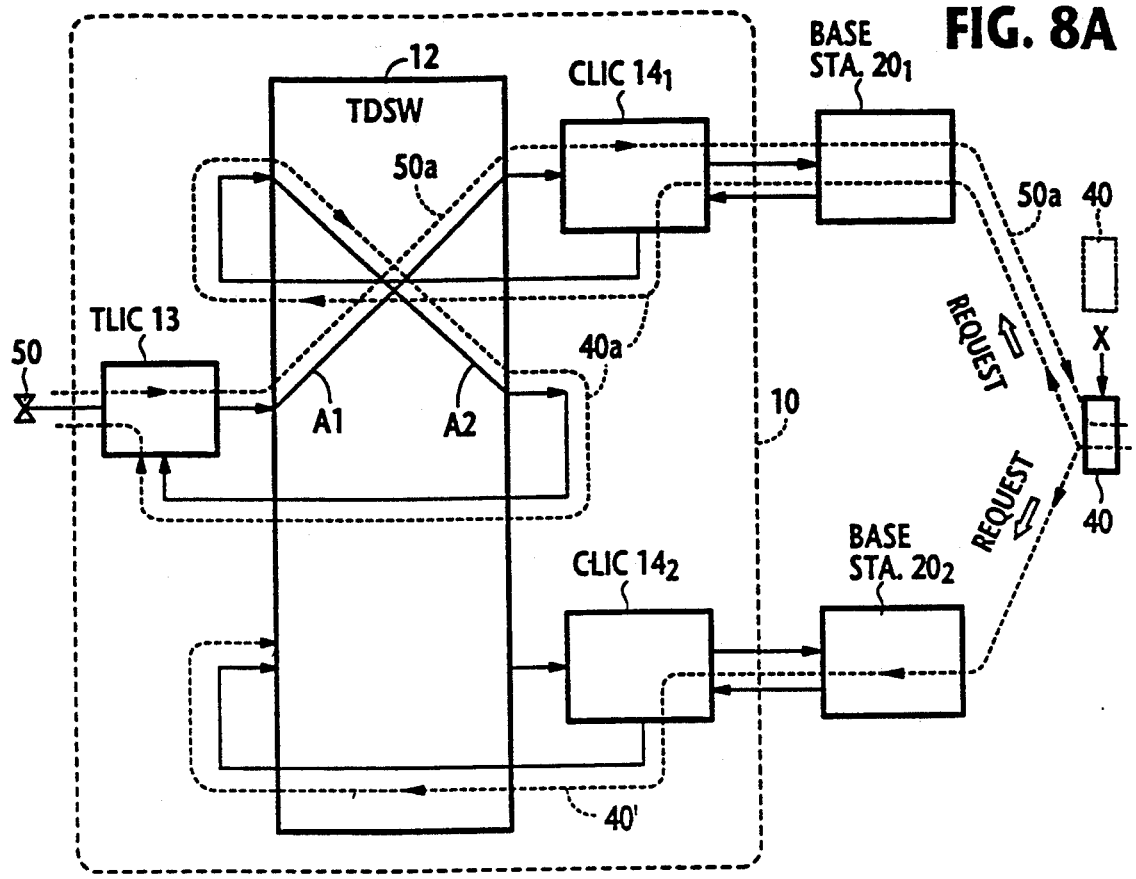
FIGS. 8A, 8B, 8C and 8D illustrate different switching configurations of the system during a handoff period.

Assume that cordless station 40 is located in the cell of base station $20_1$ and timeslot links A1 and A2 are set up in the time-division switch 12 between TLIC 13 and CLIC 141 so that cordless station 40 and PBX telephone 50 are connected by paths 40a and 50a as shown in FIG. 8A. If the cordless station is leaving the cell of base station $20_1$ and entering the cell of base station $20_2$ as indicated by arrow X, the controller of cordless station 40 senses that the quality of the signal transmitted from base station $20_1$ has lowered below the threshold level, and it selects a second, idle timeslot to establish a radio channel with base station $20_2$ and transmits a channel switching request signal. This request signal is received by base stations $20_1$ and $20_2$ and passed to CLIC's $14_1$ and $14_2$ of PBX 10 and thence to the main controller 11. When this occurs, the speech signal from cordless station 40 is also carried on the second timeslot and it reaches a terminal of the time-division switch 12 through path 40', while it is being transported on path 40a through base station $20_1$.

Figure 8B:
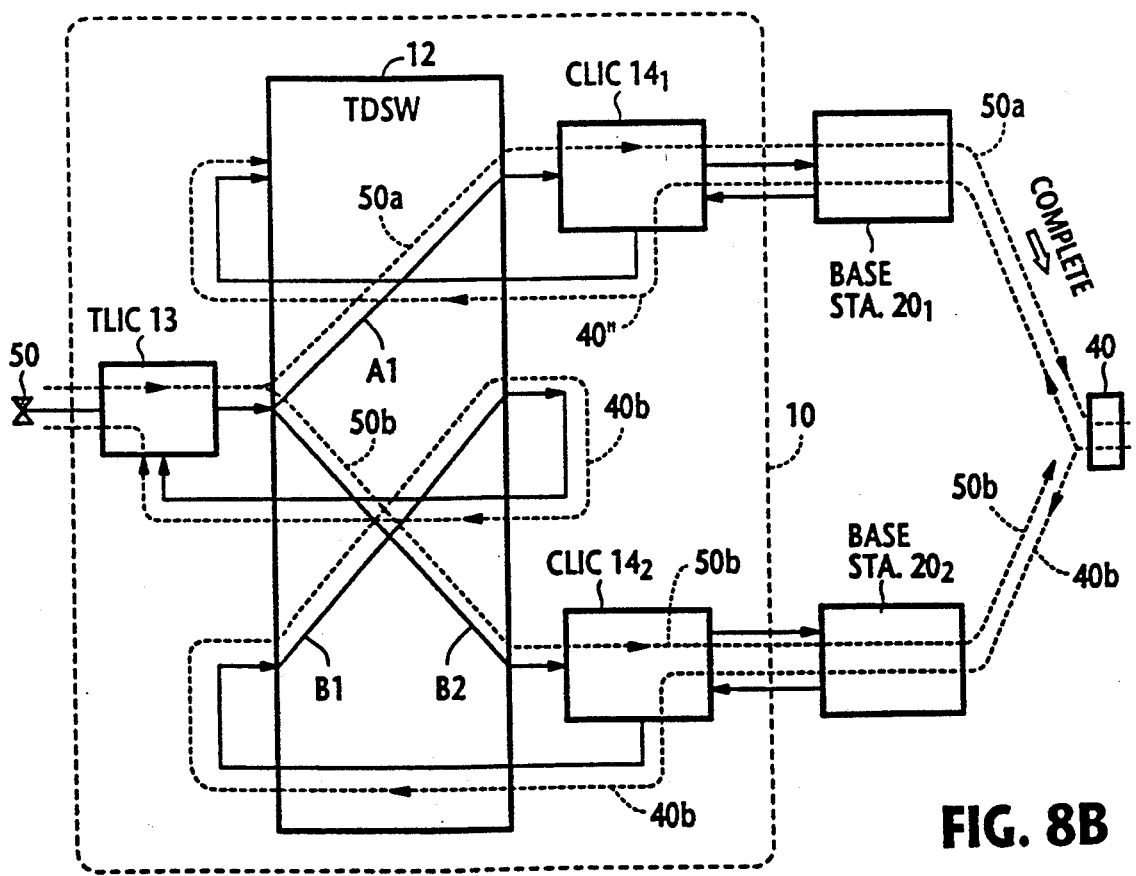

On receiving the switching request signal, the main controller 11 at PBX 10 clears link A2 to prevent the signal from cordless station 40 through path 40'' from reaching the other party, establishes links B1 and B2 in the time-division switch 12 between TLIC 13 and CLIC $14_2$ as indicated in FIG. 8B, and transmits a switching complete signal to cordless unit 40. When this occurs, signal from party 50 reaches the other party, following paths 50a and 50b and signal from party 40 reaches the other party, following a path 40b.

Figure 8C:
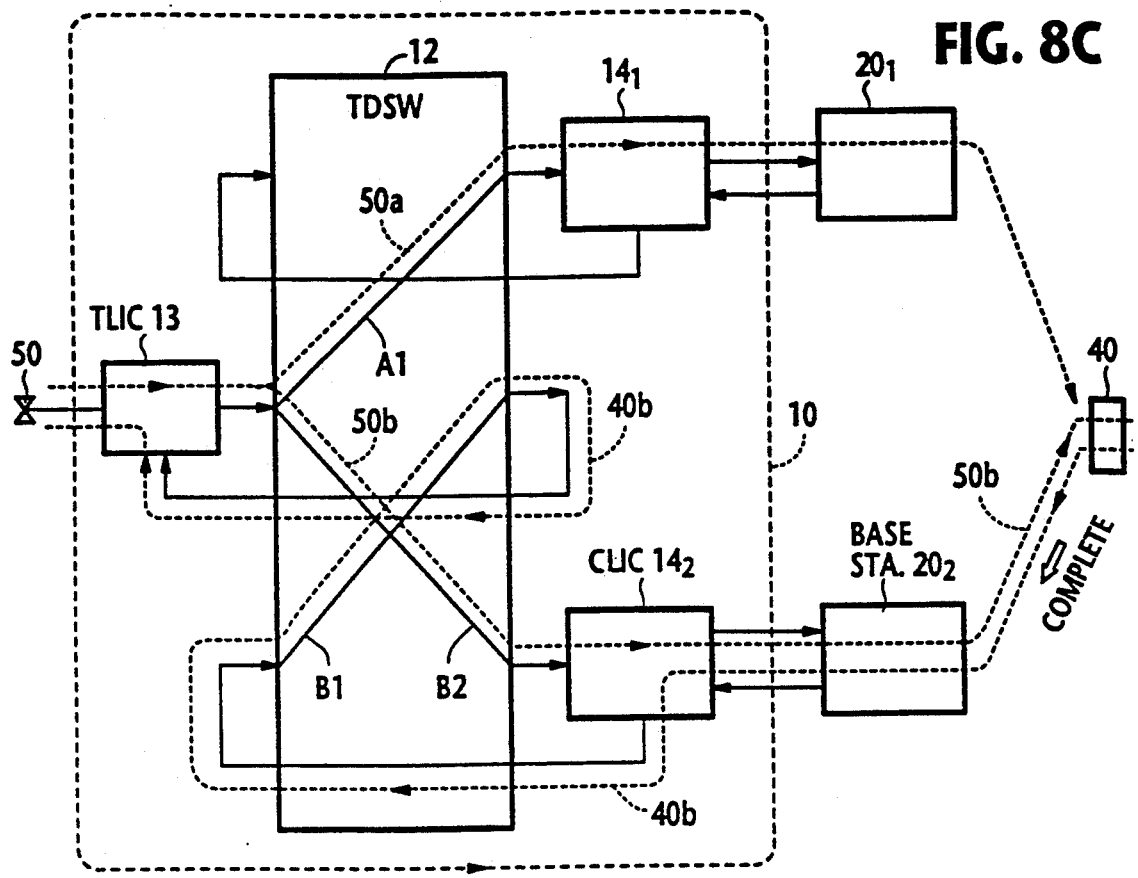

Cordless station 40 receives this switching complete signal through path 50a as shown in FIG. 8B and switches its receiving channel to the second timeslot so that signal from party 50 is received through path 50b and ceases transmission on the initial timeslot (path 40a) as shown in FIG. 8C. Following the channel switching, cordless station 40 returns a switching complete signal through path 40b to main controller 11.

Figure 8D:
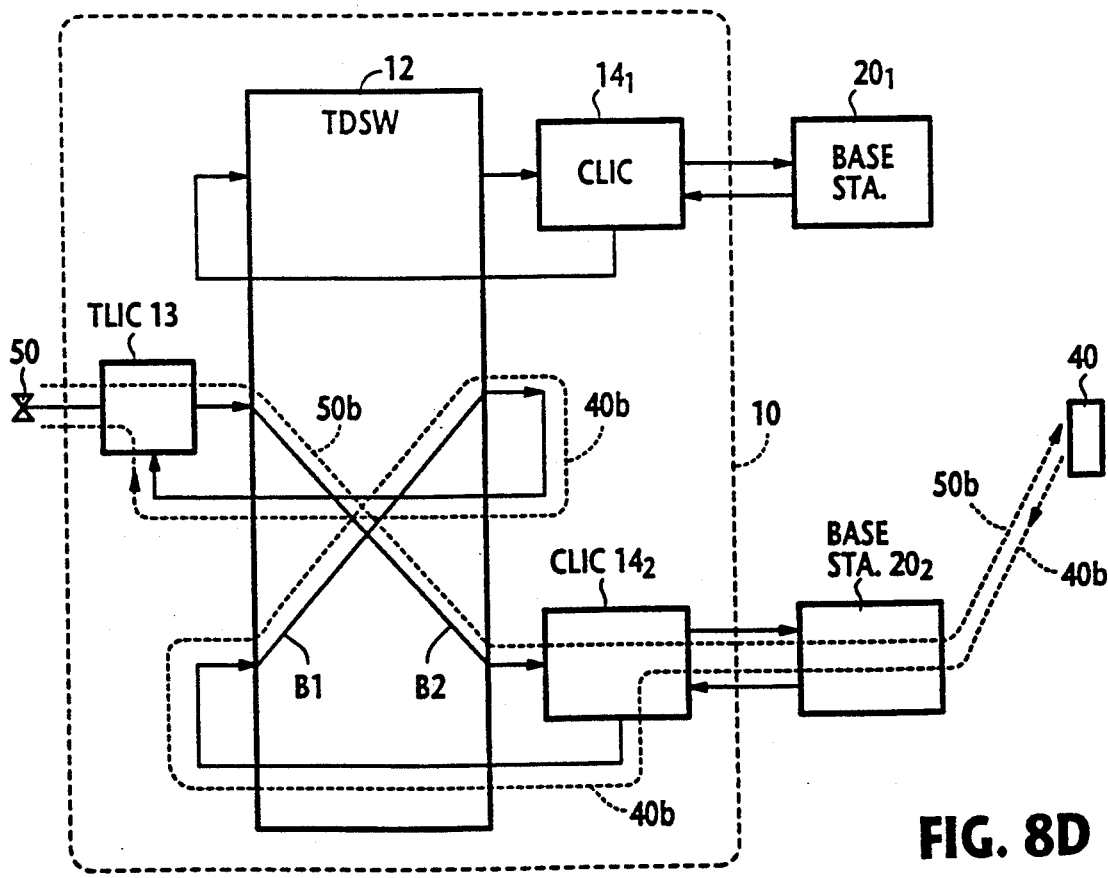

On receiving the switching complete signal from cordless station 40, main controller 11 causes time-division switch 12 to clear link A1 as shown in FIG. 8D.

Figure 9:
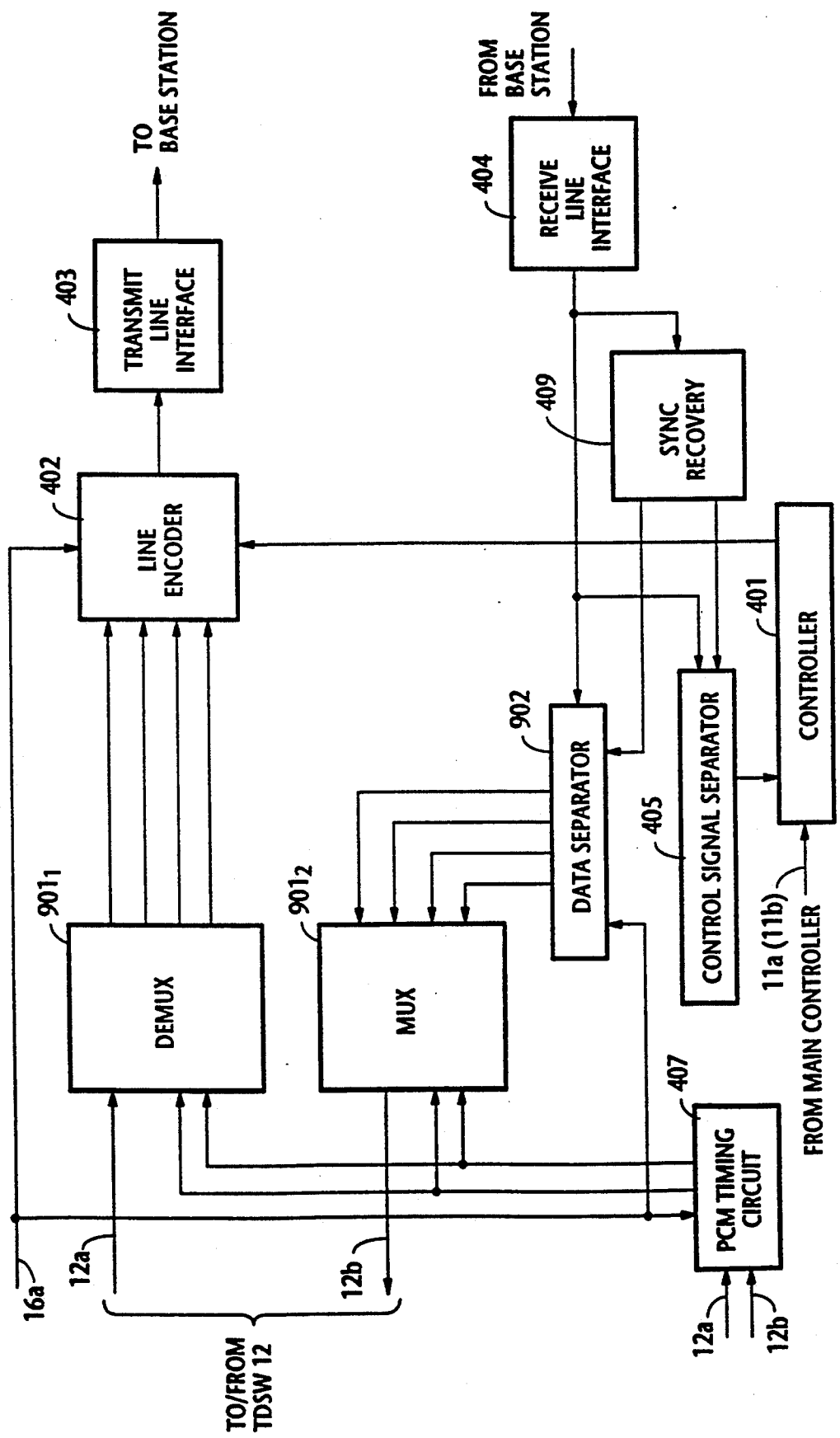
FIG. 9 shows in block diagram form a modified version of the circuit of FIG. 4.

It is seen from the above that uninterrupted channel switching is achieved. Since no signals are combined during channel switching, the system ensures transparency for data signals during handoffs. For handling data signals, each cellular line interface circuit 14 can be configured in a manner as shown in FIG. 9 in which parts corresponding to those in FIG. 4 are marked with the same numerals as those in FIG. 4. In contrast to speech signals, data signals are exchanged between PBX and mobile terminals in PCM format. Instead of PCM/ADPCM converters, a demultiplexer 901 and a multiplexer 902 are provided. Demultiplexer 901 receives PCM frame sequence on highway 12a to select four PCM signals for coupling to line encoder 402 and multiplexer 902 receives four data signals from a data separator 903 for multiplexing them into a single data stream for coupling to highway 12b.

What is claimed is:

1. A digital cellular switching system for serving mobile stations located in an area which is divided into at least first and second cells, the system comprising:
    a first and a second base station located respectively in said first and second cells for cooperating with each mobile station to establish first and second two-way time-division multiplex access (TDMA) radio links thereto, respectively; and
    timeslot switching means for cooperating with said first base station for establishing a first two-way timeslot link between timeslots of a destination station and timeslots of said first two-way TDMA radio link in response to a call request from a mobile station or from said destination station, said timeslot switching means including means responsive to receipt of a switching request signal from said mobile station for clearing a first directional path of said first two-way timeslot link to prevent part of an information-bearing signal which is received from the first base station from reaching said destination station and establishing a second two-way timeslot link between the timeslots of said destination station and timeslots of said second two-way TDMA radio link, transmitting a first switching complete signal through the first two-way TDMA radio link to said mobile station, and clearing a second directional path of said first two-way timeslot link in response to receipt of a second switching complete signal from said mobile station, each of said mobile stations including means for cooperating with said first base station for establishing said first two-way TDMA radio link, evaluating quality of a signal from said destination station, comparing the evaluated quality with a predetermined threshold, cooperating with the second base station for establishing said second two-way TDMA radio link when the evaluated quality is lower than the threshold, transmitting said switching request signal and said information-bearing signal through the first and second two-way TDMA radio links, and clearing the first two-way TDMA radio link in response to receipt of said first switching complete signal, and transmitting said second switching complete signal through the second two-way TDMA radio link.

2. A digital cellular switching system as claimed in claim 1, wherein signals transported by each of said first and second two-way timeslot links are pulse code modulation (PCM) speech signals, and signals transported by each of said first and second two-way TDMA radio links are adaptive differential PCM speech signals.

3. A digital cellular switching system as claimed in claim 2, wherein signals transported by each of said first and second two-way timeslot links further include pulse code modulation (PCM) data signals, and signals transported by each of said first and second two-way TDMA radio links are PCM data signals.

4. In a cellular communications system, a handoff method comprising the steps of:
 a) determining the quality of a signal over a first two-way connection from a destination to a mobile terminal;
 b) comparing the determined quality of said signal with a predetermined threshold;
 c) establishing a second two-way connection when said quality is lower than said predetermined threshold;
 d) transmitting a switching request signal and an information-bearing signal from said mobile terminal through said first and second two-way connections to a switching exchange;
 e) clearing one directional path of the first connection in response to said switching request signal to prevent a version of the signal passing through the first connection from reaching the destination;
 f) transmitting a first switching complete signal from said switching exchange through the other path of the first connection to the mobile terminal to allow it to clear the first connection and return a second switching complete signal; and
 g) clearing the other path of the first connection in response to the second switching complete signal.

5. In a digital cellular switching system for serving mobile stations located in an area which is divided into at least first and second cells, the system comprising a first and a second base station located respectively in said first and second cells for cooperating with each mobile station to establish first and second two-way time-division multiplex access (TDMA) radio links thereto, respectively, and timeslot switching means for cooperating with said first base station for establishing two-way timeslot links between timeslots of a destination station and timeslots of said first two-way TDMA radio link in response to a call request from a mobile station or from said destination station, a handoff method comprising the steps of:
 a) establishing a first two-way timeslot link between timeslots of said destination station and timeslots of said first TDMA radio link to establish a connection between said destination station and mobile station;
 b) constantly evaluating quality of a signal transmitted from said destination station and received at said mobile station;
 c) comparing the evaluated quality with a predetermined threshold;
 d) establishing a connection between said mobile station and said destination station through said second two-way TDMA radio link when the evaluated quality is lower than the predetermined threshold;
 e) transmitting a switching request signal and an information-bearing signal from the mobile station through the first and second two-way TDMA radio links;
 f) clearing a first directional path of said first two-way timeslot link in response to the switching request signal for preventing a version of said information-bearing signal which is transmitted from the first base station and received at said timeslot switching means from reaching said destination station and establishing a second two-way timeslot link between the timeslots of said destination station and timeslots of said second two-way TDMA radio link;
 g) transmitting a first switching complete signal through the first two-way TDMA radio link to said mobile station;
 h) clearing the first two-way TDMA radio link in response to receipt of said first switching complete signal by said mobile station, and transmitting a second switching complete signal from the mobile station through the second two-way TDMA radio link; and
 i) clearing a second directional path of said first two-way timeslot link in response to receipt of said second switching complete signal from said mobile station by said timeslot switching means.

* * * * *

UNITED STATES PATENT AND TRADEMARK OFFICE
CERTIFICATE OF CORRECTION

PATENT NO. : 5,323,446
DATED : June 21, 1994
INVENTOR(S) : Susumu Kojima et al

It is certified that error appears in the above-indentified patent and that said Letters Patent is hereby corrected as shown below:

Column 6, line 1, delete "141" and insert --$14_1$--.

Signed and Sealed this

Fourth Day of April, 1995

Attest:

BRUCE LEHMAN

*Attesting Officer*    Commissioner of Patents and Trademarks